United States Patent [19]

Sapp

[11] 4,348,189
[45] Sep. 7, 1982

[54] METHOD FOR READING TYPING AND SPACING ERRORS

[76] Inventor: Michael L. Sapp, Santa Maria, Calif. 93454

[21] Appl. No.: 99,202

[22] Filed: Nov. 30, 1979

Related U.S. Application Data

[63] Continuation-in-part of Ser. No. 879,074, Feb. 21, 1978, abandoned.

[51] Int. Cl.³ .............................................. G09B 13/00
[52] U.S. Cl. .................................................. 434/227
[58] Field of Search ...................... 434/158, 227, 165; 283/45, 46; 33/1 B

[56] References Cited

U.S. PATENT DOCUMENTS

| | | | |
|---|---|---|---|
| 1,254,028 | 1/1918 | Coubal | 434/165 |
| 1,906,371 | 5/1933 | Dreifuss | 283/45 X |
| 2,375,427 | 5/1945 | Mannino | 283/45 X |
| 2,497,200 | 2/1950 | Appel | 434/349 |
| 3,165,319 | 1/1965 | Benima | 273/293 |
| 3,281,968 | 11/1966 | Culmone | 434/158 |
| 3,898,748 | 8/1975 | Flanders | 434/158 |

OTHER PUBLICATIONS

*Popular Science*, p. 334, "Slide Teaches Student". Exact publication date unknown, but prior to Feb. 1977.

*Primary Examiner*—William H. Grieb
*Attorney, Agent, or Firm*—Vernon D. Beehler

[57] ABSTRACT

A method for rapidly and accurately evaluating the number of errors in a test document typed by a test applicant makes use of an original sample master sheet having subject matter imprinted on it in conventional type with margins and spacing established by rule. There is a duplicate of the original master sheet printed in the same type in white ink on a transparent check sheet having identical margins and spacing to those for the master sheet.

The test document is typed in black ink of the same type by the person whose skill is to be tested, using the same margins and spacing as directed for the original master sheet.

The transparent check sheet is placed over the test document with edges of the sheets in alignment. The white typed subject matter should be in alignment with the black typed subject matter. Errors are revealed by non-aligned black portions of the typed letters on the test document where they do not perfectly match the white letters. If horizontal or vertical alignment of words is out of register, the error is noted and words then aligned with each other.

All words having one or more black portions visible adjacent the white overlying words are tabulated as a record of errors.

2 Claims, 9 Drawing Figures

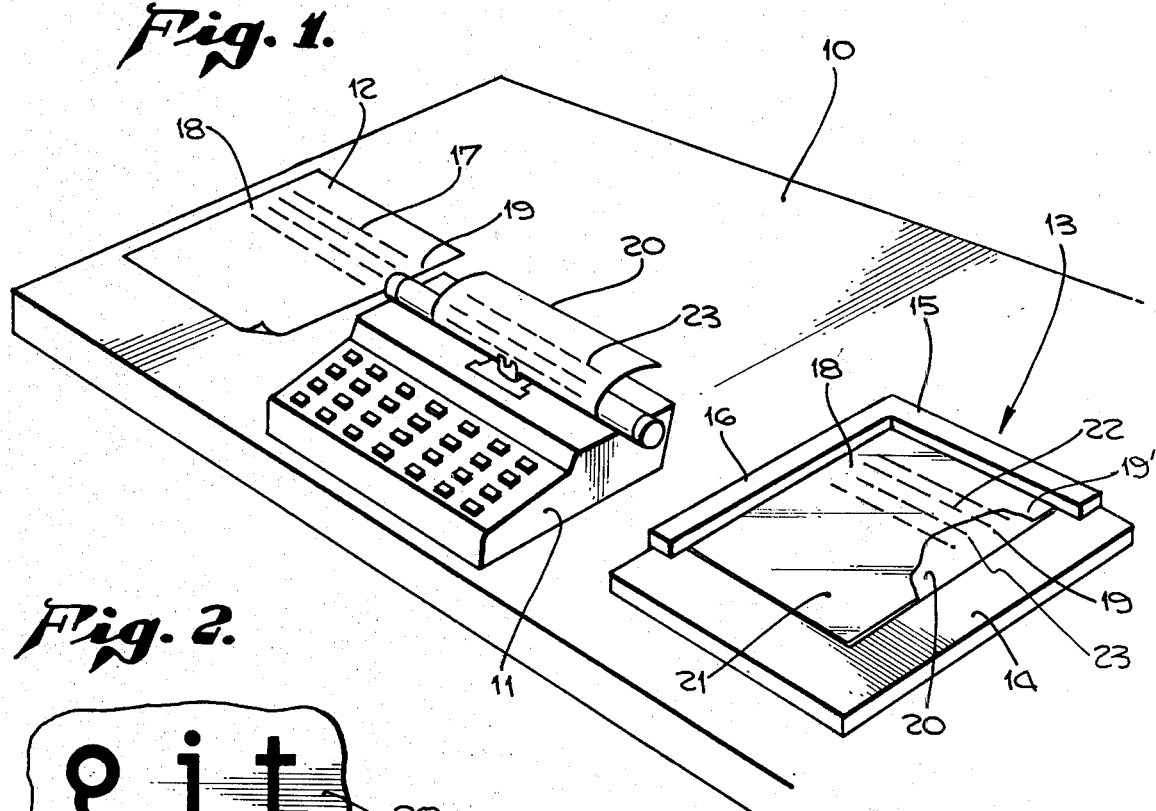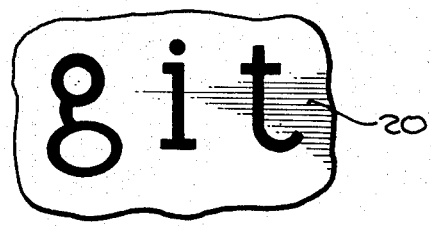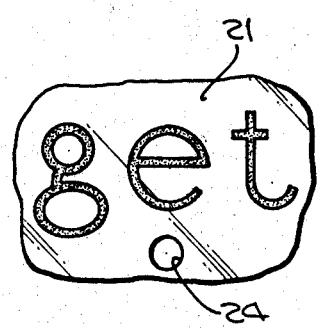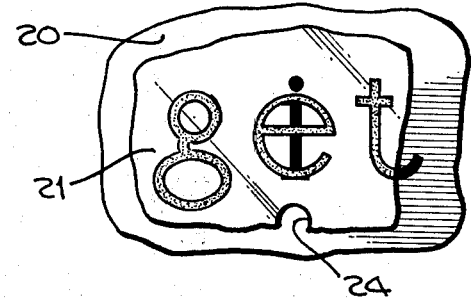

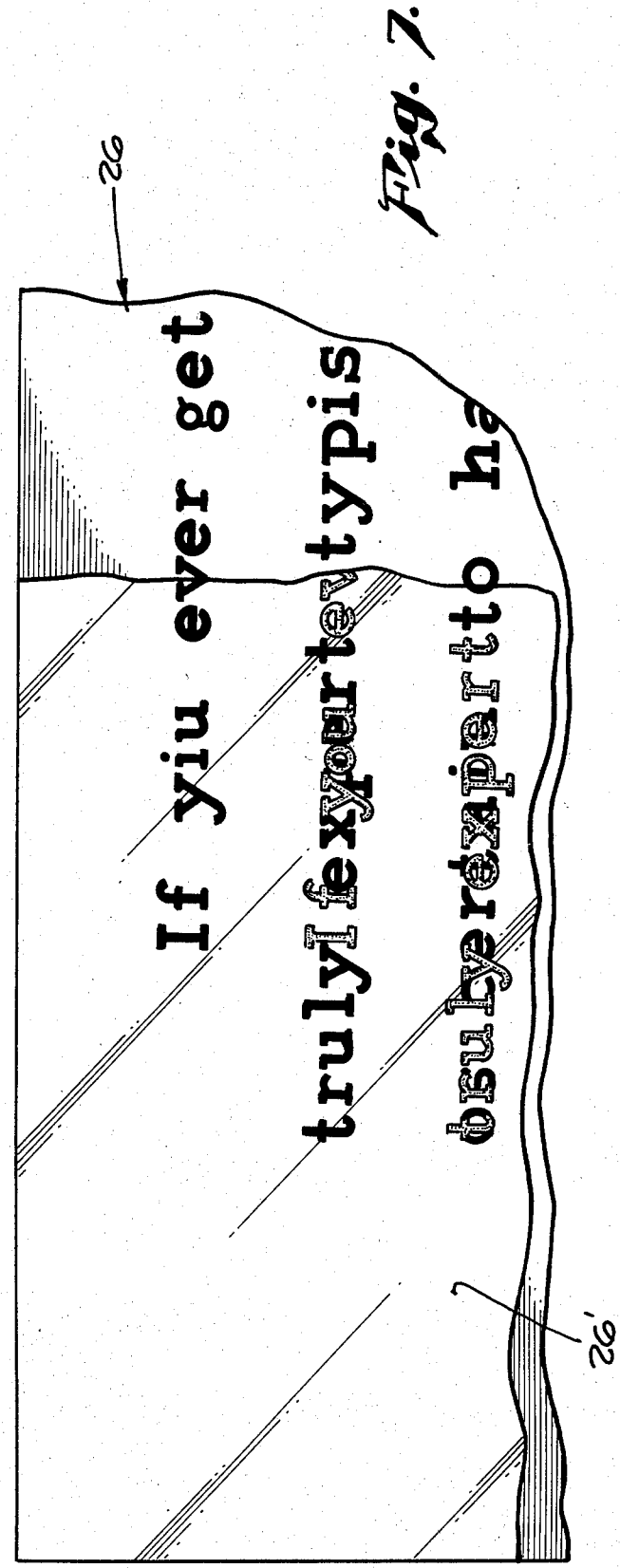

METHOD FOR READING TYPING AND SPACING ERRORS

This is a continuation-in-part of Ser. No. 879,074, filed Feb. 21, 1978, now abandoned.

In testing personnel for typing skills, conventional practice has been to have the applicant type one or more pages of subject matter customarily copied from a selected source and then have a checker manually proofread the typed material for errors, such as errors in spelling, miss-hit keys, punctuation, capitals, spacing, etc. Where there is need for running a very large number of tests of this character as, for example, in personnel departments of large businesses, and in personnel testing for employment recommendations, the material comprising originals from which tests are typed becomes relatively standardized. Although the material will be new to the person taking the test, proofreaders become familiar with the text in order to improve the speed and accuracy with which they can determine the test results. Even when this technique is practiced, an experienced and conscientious proofreader must, of necessity, spend five to ten minutes checking a page of typed material in order to count the errors, inaccuracies and related test criteria in order to set a value on the skill and ability of the person taking the test. Obviously when a great number of tests are run on a daily basis, a tremendous amount of time is consumed in proofreading, and at a corresponding expense. Furthermore, despite a conscientious objective on the part of the proofreader, there are bound to be errors which may count either for or against the person being tested. In either event, inaccuracies are objectionable. Additionally, the time consumed in typing an established piece of material is also of significance in providing a test criteria, because there is always a measure of skill to be determined where errors are related to the speed of typing.

Instructions also include specific directions for setting margins and for vertical spacing.

It is, accordingly, among the objects of the invention to provide a new and improved method and related apparatus for quickly and accurately counting the number of errors committed by a typist when typing from original legend material which is set up as a basis for the test.

Another object of the invention is to provide a new and improved method and related apparatus for not only quickly counting the number of errors on a typed page, but also counting such errors with a considerable degree of accuracy, quickly, and without need for actually proofreading the legend material.

Still another object of the invention is to provide a new and improved method and related apparatus for rapidly testing not only the errors in typing from an original sheet of legend material, but providing also rapid and accurate means for noting the errors for the benefit of both the reader and participant alike, and also noting visably the lapsed time at any particular point and at any stage of the test.

Still further among the objects of the invention is to provide a new and improved method and related apparatus for not only quickly and accurately determining both the accuracy and speed of typing, but also to provide a method which is sufficiently simple so that it needs no special skill on the part of the person doing the examining and also of such character that such material as may be needed for noting the test and test results adds very little to the cost of the examination.

With these and other objects in view, the invention consists in the construction, arrangement and combination of the various parts of the method and related apparatus, serving as an example only of one or more embodiments of the invention, whereby the objects contemplated are obtained, as hereinafter disclosed in the specification and drawings, and pointed out in the appended claims.

FIG. 1 is a perspective view showing significant apparatus for practice of the method.

FIG. 2 is a plan view of a fragment of the test sheet showing the original typed sample.

FIG. 3 is a plan view of a corresponding fragment of the transparent check sheet.

FIG. 4 is a plan view of the step showing the check sheet of FIG. 3 overlying the test sheet of FIG. 2.

FIG. 5 is a plan view showing a larger fragmentary portion of the check sheet in position overlying a corresponding portion of the test sheet.

FIG. 6 is a plan view of a block of typed subject matter to be checked for vertical alignment.

FIG. 7 is a plan view of the typed subject matter of FIG. 6 with the check sheet in overlying position.

Figure 8:
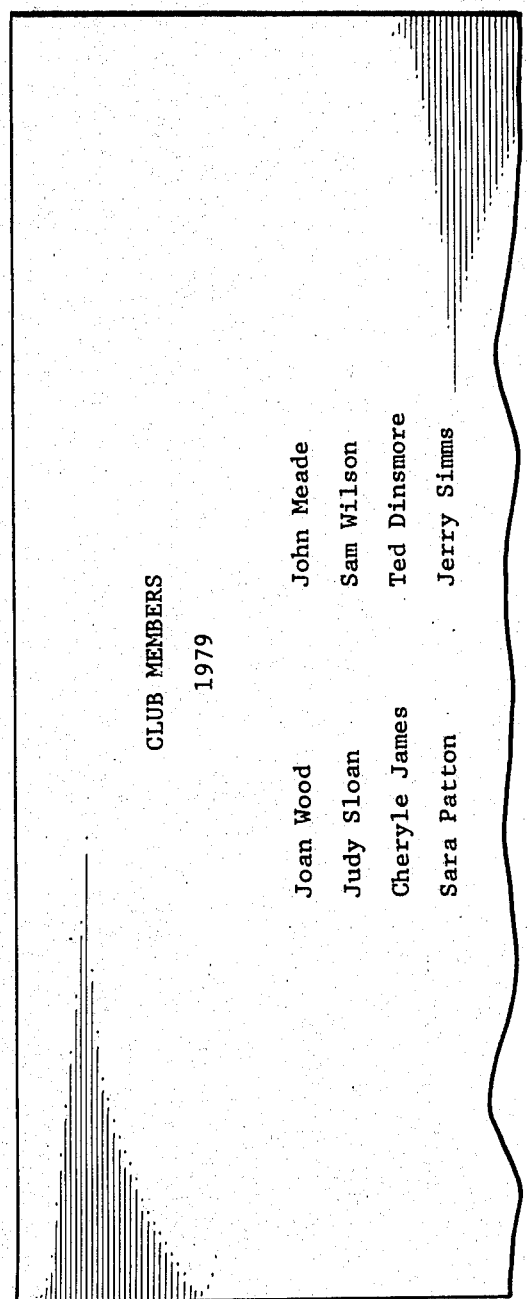
FIG. 8 is a plan view of a block of typed subject matter to be checked for centering on the page.

In an embodiment of the invention chosen for the purpose of illustration, there is shown a table 10 on which is accommodated a typical conventional typewriter 11 on one side of which is placed one of the typical sample master sheets 12. For convenience there is provided a rack 13 consisting of a base 14 to which is attached a horizontal guide strip 15 and a vertical guide strip 16.

The sample master sheet 12 has imprinted on it, preferably in black ink, a legend 17 which is ultimately to be copied by a person operating the typewriter 11. The legend consists of one to two paragraphs of typewritten material with customary left and right-hand margins 18 and 19, and with words separated preferably by a single space, in precisely the same fashion as conventional typing material. Virtually any legend material can be employed. Some material may contain special words, abbreviations, punctuation and such characters as quotation marks, question marks, asterisks, and other conventional characters such, for example, but not limited to, parenthetical marks, brackets, etc.

This is the material which is to be typed precisely by a test sheet or document 20 by the person whose skill is to be tested using the typewriter 11 with the same type size and style as appearing on the master sheet.

For ultimately checking the test document 20, there is provided a transparent check sheet 21. The transparent check sheet 21 should be, for convenience, precisely the same size as the test document. What is very important, however, is that on the check sheet precisely the same legend material is imprinted as the legend material 17 of the master sheet 12. The type of the legend material must be precisely the same as the type of the typewriter as well as the master sheet. it must also observe the same margins 18' and 19' as the margins 18 and 19 of the master sheet, and also the same spacing. In other words, the legend material on the transparent check sheet 21 should be an exact duplicate of the master sheet 12 except that the type imprinted on the check sheet must be of a contrasting color. The most probably advantageous contrasting color for the check sheet is white ink, thereby to contrast the black ink of the master sheet with the white ink of the check sheet. Other contrasting colors, howevr, are also usable such, for example, red versus green, violet versus white, yellow versus blue, in the same or reverse order, or, in fact, any contrasting colors or even for making use of fluorescent color on one or another of the sheets.

In practicing the method, the person whose skill is to be tested is instructed to make use of the typewriter 11 and type on the test document 20 a precise duplicate of the legend 17 of the master sheet 12, observing precisely the same margins and spacing.

After the test document has been prepared as instructed, it is placed on the base 14 and positioned edgewise against the horizontal guide 15 and vertical guide 16 as suggested on the right-hand side of FIG. 1. The transparent check sheet 21 is then placed in overlying relationship with respect to the test document and it is also aligned with the guide strips 15 and 16. The purpose of the guide strips is to make it possible for the person doing the testing to quickly and easily place the check sheet in precise overlying relationship so that the legend material 22 of the check sheet precisely overlies legend material 23 of the test document 20.

Just by way of example, let it be assumed that the word "get" is one of the words appearing in the legend 17 of the master sheet 12. Let it be assumed further that the person to be tested in copying the legend of the test document 20 misspells the word "git", as appearing in FIG. 2. The letters "git" will be typed preferably in black type.

On the transparent check sheet 21 the same word, but correctly spelled as "get", also appears, this time printed in ink of a contrasting color as, for example, white, the white ink being opaque. This same word "get" on the transparent check sheet will be at precisely the same location on the sheet as the misspelled word "git" on the test document.

With the sheet 21 in overlying relationship, as shown in FIG. 4, the black letters, correctly typed, as, for example, "g" and "t" would be obscured completely by the white letters "g" and "t" of the check sheet. Portions of the black letter "i" incorrectly typed on the test document 20 will be visible through the transparent material of the check sheet 21 where there is no portion of the white letter "e" in overlying relationship. In the case of the white letter "e" overlying the black letter "i", a very substantial portion of the letter "i" will be visible and the person tabulating test results can readily observe that the word "get" has been misspelled. For convenience in noting such misspelling, there is provided a perforation 24 below the word "get" on the check sheet so that the checker can, if choosing to do so, mark the test document through the perforation of the check sheet.

In FIG. 5 approximately four words of legend material are shown consisting of the expression "if you ever get" in order to convey an understanding how the misspelling of a multiple number of words may appear when the accuracy is being checked. On this occasion the person whose skill is being tested has inadvertently struck two "y's" in typing "you", has spelled "ever" as "evar" in addition to the misspelling "git". As a consequence, when the transparent check sheet 1 has been placed in overlying relationship with respect to the test document 20 in the manner previously described, those portions of the second letter "y" which the white letter "o" overlies are clearly visible as dark spots through the transparent check sheet. Similarly, though in a less pronounced fashion where the word "ever" has been misspelled as "evar", the second letter "e" overlies the erroneous letter "a". There will be, however, substantial portions of the black letter "a" visible and not obscured by the correct letter "e", those black portions being readily located by the checker, who also notes the erroneous "y" and the erroneous "i". Since misspelled words are more of consequence than individual letters or characters, perforations 24 through the transparent check sheet are applied approximately midway between opposite ends of the individual words so that the checker can mark misspelled words.

When, for example, several hundred words have been typed on the test document, the number of misspelled words can be quickly and readily determined, and counted with equal readiness by the checker who merely records the number of instances where a black area appears in connection with any white letter. The contrasting exposed black portion of each erroneously typed letter stands out so prominently that an entire page of typed material can be checked in no more than a few seconds.

It is, of course, possible that an error of no more than a misproper spacing between words may have occurred. In such event, a correct determination of errors can be very quickly and accurately noted by merely shifting the transparent check sheet one space with respect to the legend material of the test document, and black areas again noted should any be visible.

Because of the precise copying technique made reference to, the method can be readily applied to the teaching of how to correctly type a letter inasmuch as margins and spacing need to be properly followed as well as the correct typing.

Inasmuch as typing speed is often a significant factor, typing speed can be readily measured by employment of consecutive numerals to the legend material of the transparent check sheet 21. It has been determined that the average length of a word in the English language is five letters. Therefore, by placing numbers on the legend material, one number for each five letters for the entire page of the legend material 22 wherever the copying of the legend material 23 on the test document stops for a given length of time, it can be immediately noted by the corresponding number appearing on the check sheet. Obviously the numbers will run into two digits and could conceivably run into three digits on a long page of typed material. Such numbering, however, can repeat by employing only one and two digit numbers at intervals of one hundred and have the checker be sure of quickly and accurately determining typing speed. This is true particularly inasmuch as usual typing speeds do not vary greatly between fifty words per minute and ninety words per minute.

In the illustration of FIG. 5, if in any time interval of one minute the typist had reached the word "get" where the number sixty-two is imprinted below the "g", it would immediately be apparent that the typist was typing sixty-two words per minute. From the foregoing explanation of method and accompanying apparatus, it will be apparent that the checker can quickly and accurately determine the number of misspelled words in an entire page of typed material by merely noting the number of black areas without the need for doing any proofreading of complete words in any fashion whatsoever.

All that is necessary is a mere mechanical allotment of legend material and one transparent sheet which has on it the same typed legend material as the initial allotment.

To test the ability of the person being tested to understand and execute instructions for centering selected subject matter on the page, typical standard instructions may be given. An example of this is to instruct the person being tested to back space one space from the center of the page for each two of the characters and spaces appearing on a line. When this instruction is followed, the centering of the typed subject matter on the test document will appear as shown on the master sheet 25 in FIG. 8, the type being dark in color.

The identical subject matter, properly centered, appears in type of the same character and size on the transparent sheet 25' but on this occasion the letters are white, or a color in contrast to that on the test document 25".

Figure 9:
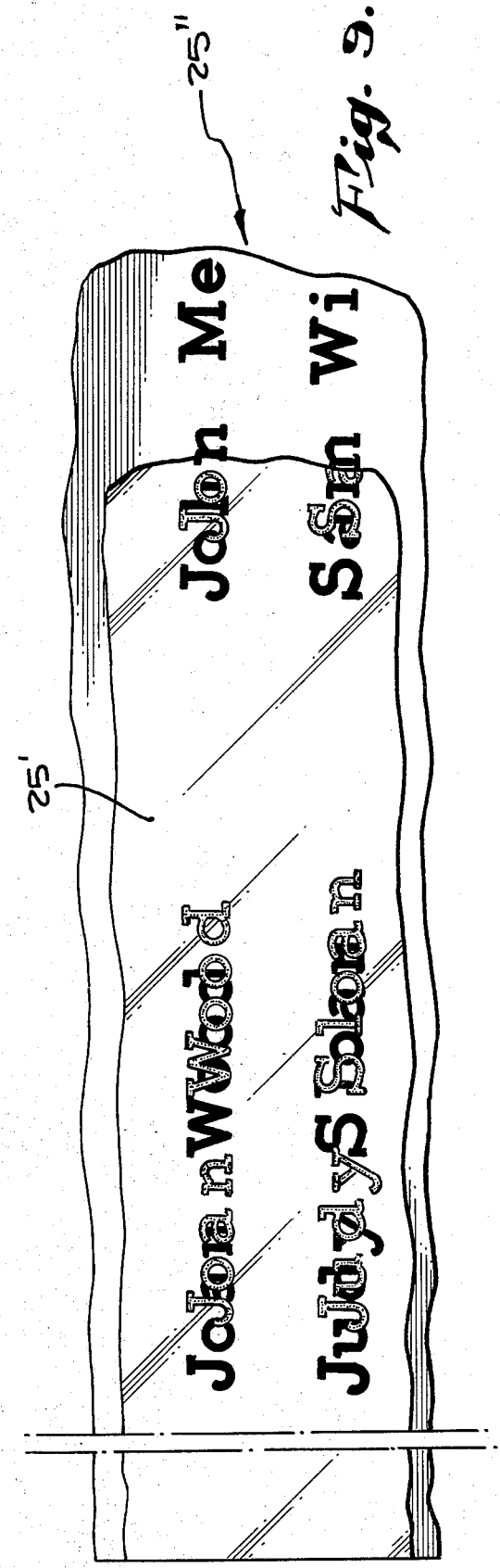
FIG. 9 is a plan view of the typed subject matter of FIG. 8 with the check sheet in overlying position.

When such instructions have not been correctly followed, each line back-spaced in error will appear one or more spaces further toward the left, as shown in FIG. 9. The displacement could, in the alternative, be toward the right. The underlying incorrectly centered subject of the test document 25" shows in FIG. 9 as dark letters. Such lines may also include individual letters incorrectly struck.

When under such circumstances the check sheet 25' is applied to the test document 25" with vertical and horizontal edges in register, the first letter of each line incorrectly spaced will not register with the check sheet, as depicted in FIG. 9. The number of spaces off center can be counted by the number of full dark characters in the line which stand clear. A great many dark areas will appear throughout the line.

To check the same line for typing errors, the check sheet is shifted laterally relative to the test document until the first letters of the line in question are in register, after which individual letters or characters typed in error are revealed by a showing of adjacent dark areas, as in the initially described condition.

A method for checking vertical spacing is revealed in FIGS. 6 and 7. FIG. 6 shows subject matter positioned by the person being tested at a location three spaces closer to the top of the test document 26. This may be assumed to be contrary to instructions for the test.

On the check sheet 26' the same subject matter is in the correct vertical spacing, and in ink of a different color, as shown in FIG. 7.

When the check sheet and test document have respective vertical and horizontal edges in alignment with the check sheet in overlying relationship, an entire line of dark characters of the test document appears in full view above the top line of the check sheet.

Where the vertically spaced subject matter is in error by one or more lines, an entire line may be visible through the material of the check sheet, as in FIG. 7. Where the spacing is in error by a sufficient number of lines to have a complete line on the check sheet overlie a complete line on the test document, a great number of dark areas will appear.

After a vertical alignment error of the kind made reference to has been noted, the check sheet and test document may be shifted relative to each other until corresponding lines are in proper overlying relationship. Individual characters, which may have been typed in error, will then boldly appear as dark areas readily available for counting.

While a particular embodiment of the present invention has been shown and described, it will be obvious to those skilled in the art that changes and modifications may be made without departing from the invention in its broader aspects, and therefore, the aims of its appended claims is to cover all such changes and modifications as fall within the true spirit and scope of this invention.

Having described the invention, what is claimed as new in support of Letters Patent is as follows:

1. A method for determining typing errors comprising preparing of a master sheet having a legend thereon of simulated type characters at selected spacing and margins, preparing on a transparent sheet the same legend in simulated type characters and in ink of one color, placing the characters on the transparent sheet in the same selected spacing and margins as appearing on the master sheet, typing on a test page in type corresponding to that of the transparent sheet but in ink of a contrasting second color the same legend material and at the same selected spacing and margins as appearing on the master sheet, superimposing the transparent sheet on the test page with characters matched as to spacing and margins and then tabulating exposed spots of characters of the second color which are visible adjacent corresponding characters of the first color, perforating the transparent sheet with a series of laterally spaced holes at substantially equal intervals, numbering the holes successively as speed intervals, imprinting the test page through a hole at the end of the typed legend and marking the imprint with the corresponding number to indicate time consumed in typing the legend.

2. A kit for counting errors on a test page bearing a typed legend having spacing and margin characteristics comprising a master sheet having a legend thereon of simulated type characters with spacing and margin characteristics from which the test page can be copied in ink of a selected color and a transparent sheet bearing the same legend as appearing on the master sheet with the same spacing and margin characteristics and simulated type of substantially the same character, the ink on the transparent sheet being substantially opaque and different in color from the ink of the test page, the transparent sheet having on it a succession of speed characters at substantially equally spaced lateral intervals, there being a hole in the transparent sheet adjacent each spaced character through which the test page may be marked.

* * * * *